Figure 1:
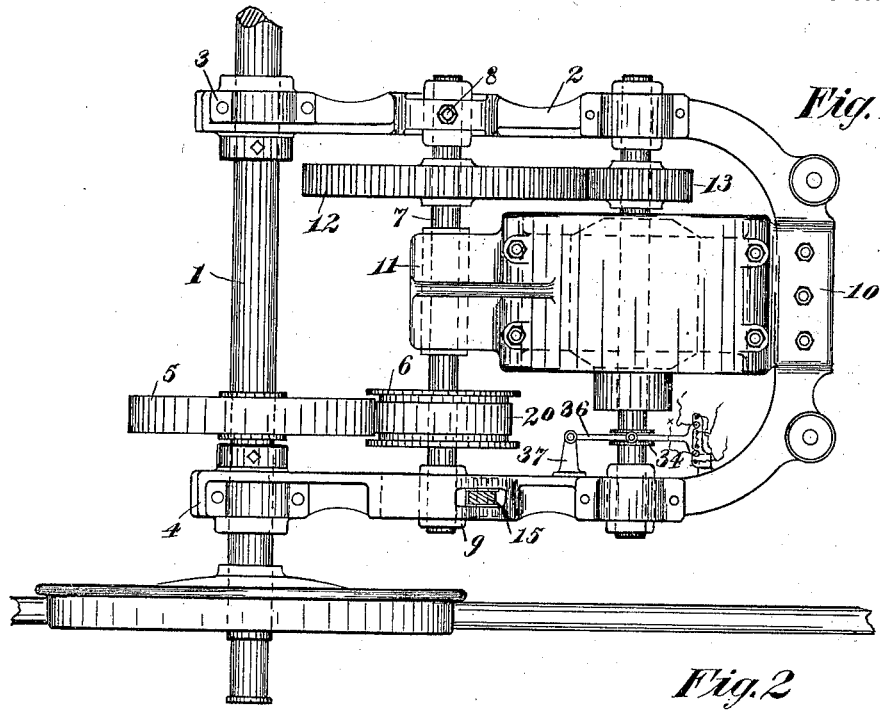

No. 627,246. Patented June 20, 1899.
J. WAYLAND.
GENERATING ELECTRICITY FOR CARS, &c.
(Application filed July 26, 1898.)
(No Model.) 5 Sheets—Sheet 1.

Witnesses:
Geo. B. Rowley
Elizabeth Ewing

Inventor:
James Wayland.
By
Attorney.

No. 627,246. Patented June 20, 1899.
J. WAYLAND.
GENERATING ELECTRICITY FOR CARS, &c.
(Application filed July 26, 1898.)
(No Model.) 5 Sheets—Sheet 2.

Witnesses:
Geo. B. Rowley
Elizabeth Ewing

Inventor:
James Wayland.
By L. H. Head
Attorney.

THE NORRIS PETERS CO., PHOTO-LITHO., WASHINGTON, D. C.

No. 627,246. Patented June 20, 1899.
J. WAYLAND.
GENERATING ELECTRICITY FOR CARS, &c.
(Application filed July 26, 1898.)
(No Model.) 5 Sheets—Sheet 3.
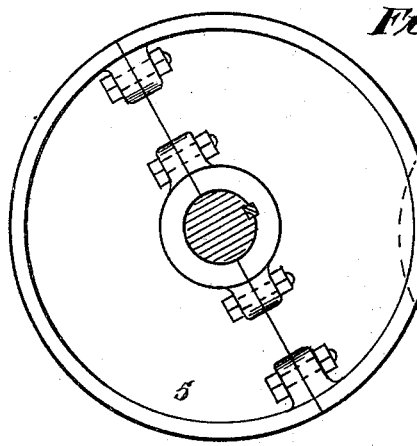
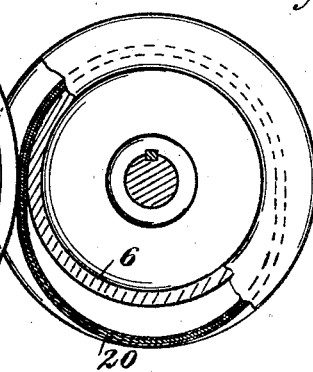
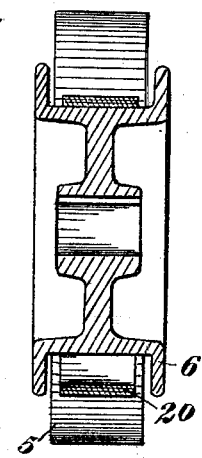
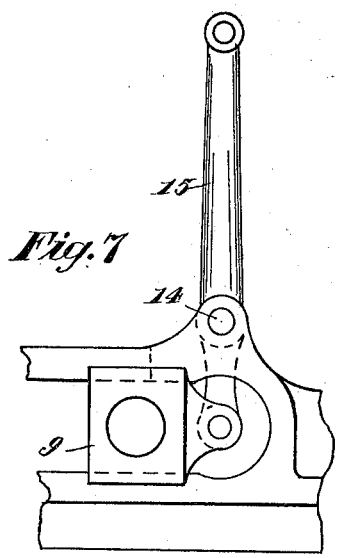
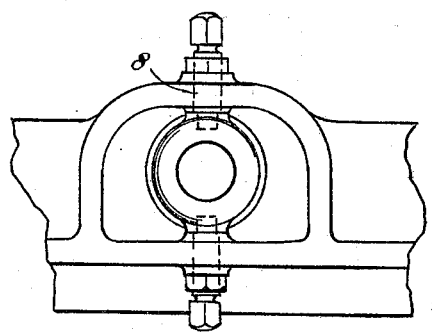
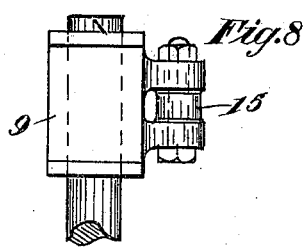
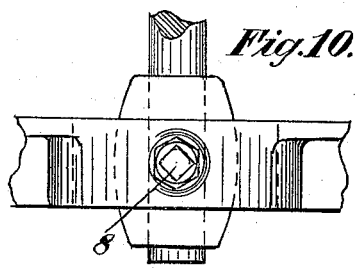
Witnesses:
Geo. B Rowley
Elizabeth Ewing
Inventor:
James Wayland.
By R H Head
Attorney.
THE NORRIS PETERS CO., PHOTO-LITHO., WASHINGTON, D. C.

No. 627,246. Patented June 20, 1899.
J. WAYLAND.
GENERATING ELECTRICITY FOR CARS, &c.
(Application filed July 26, 1898.)
(No Model.) 5 Sheets—Sheet 4.
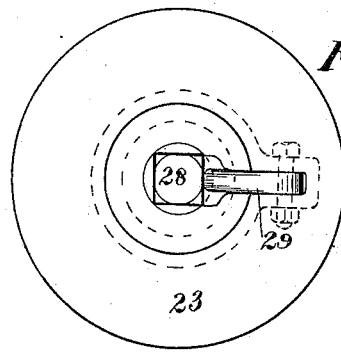
Fig. 11.
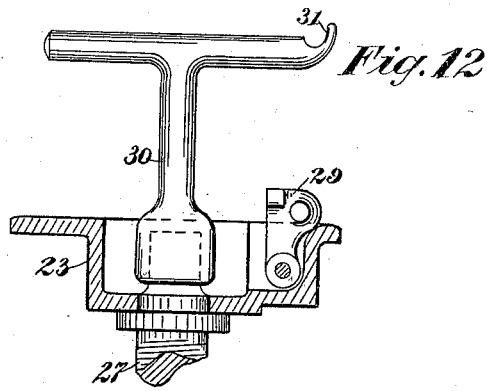
Fig. 12.
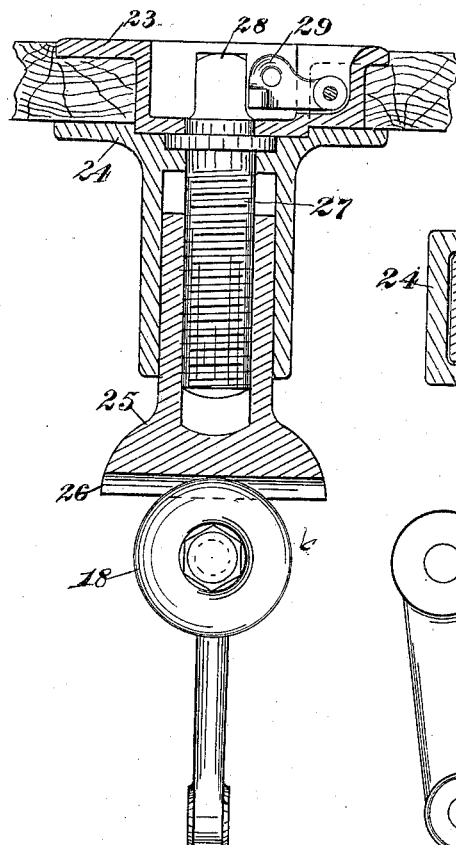
Fig. 13.
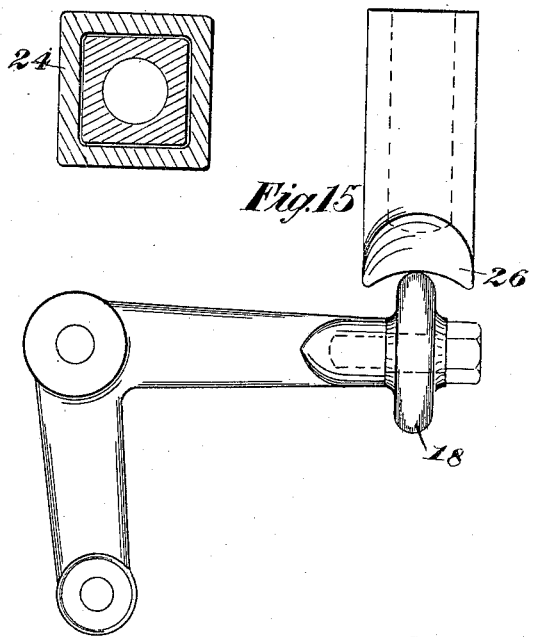
Fig. 14.
Fig. 15.
Witnesses:
Geo. B Rowley
Elizabeth Ewing
Inventor:
James Wayland.
By Rustead
Attorney.

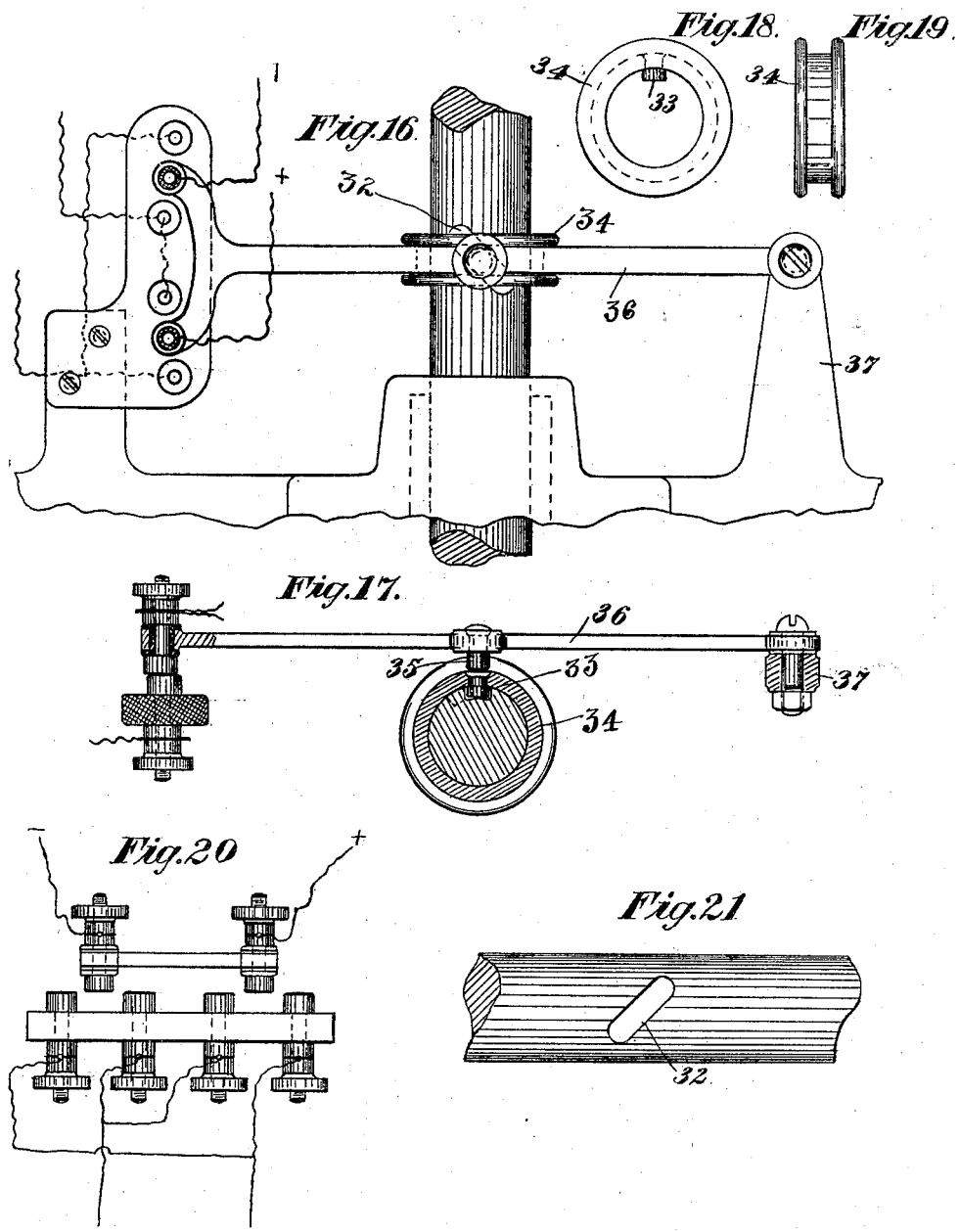

UNITED STATES PATENT OFFICE.

JAMES WAYLAND, OF NEWARK, NEW JERSEY.

GENERATING ELECTRICITY FOR CARS, &c.

SPECIFICATION forming part of Letters Patent No. 627,246, dated June 20, 1899.

Application filed July 26, 1898. Serial No. 686,900. (No model.)

*To all whom it may concern:*

Be it known that I, JAMES WAYLAND, a citizen of the United States, and a resident of Newark, county of Essex, and State of New Jersey, have invented certain new and useful Improvements in Generating Electricity for Cars or other Vehicles, of which the following is a specification.

This invention relates to the generation of electricity by the movement of cars or other vehicles, the object being to render an electric current available for lighting or other uses on the car or vehicle.

In carrying out the invention I mount on the truck or frame upon which the body of the car or vehicle is supported a dynamo-electric generator adapted to be thrown into and out of gear with a drive-wheel secured to the axle, means being provided by which the generator can be shifted by an operator inside the car. In order to compensate for the change of position of the car-body with relation to the truck in rounding curves, I provide a movable connection by which the working relation of the adjusting device inside of the car and the shifting apparatus for throwing the dynamo into and out of gear will not be disturbed by such change of position. The generator is supported on a yoke having its arms pivotally hung upon the axle and supported at its other end by links connected to the frame of the truck. One end of the shaft of the generator is swiveled in one side of the yoke, and the other end is or may be supported in a sliding box or bearing controlled by the adjusting device within the car, said box being normally pressed away from the drive-wheel mounted on the car-axle by a spring or springs.

My invention involves various features of novelty, which will be hereinafter more fully described, and will be definitely indicated in the claims appended to this specification.

Figure 2:
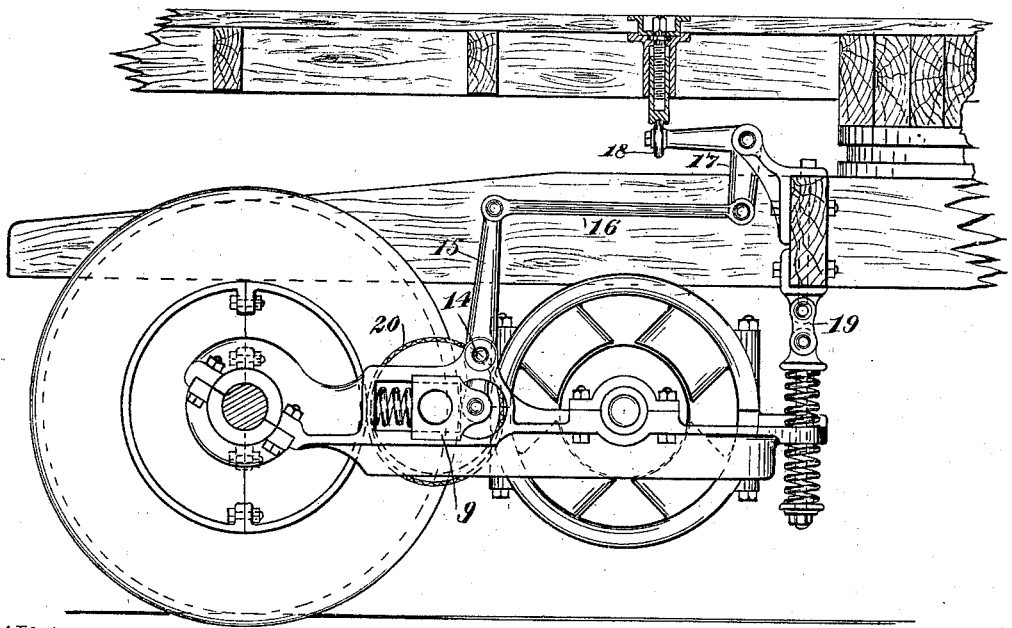
Figure 3:
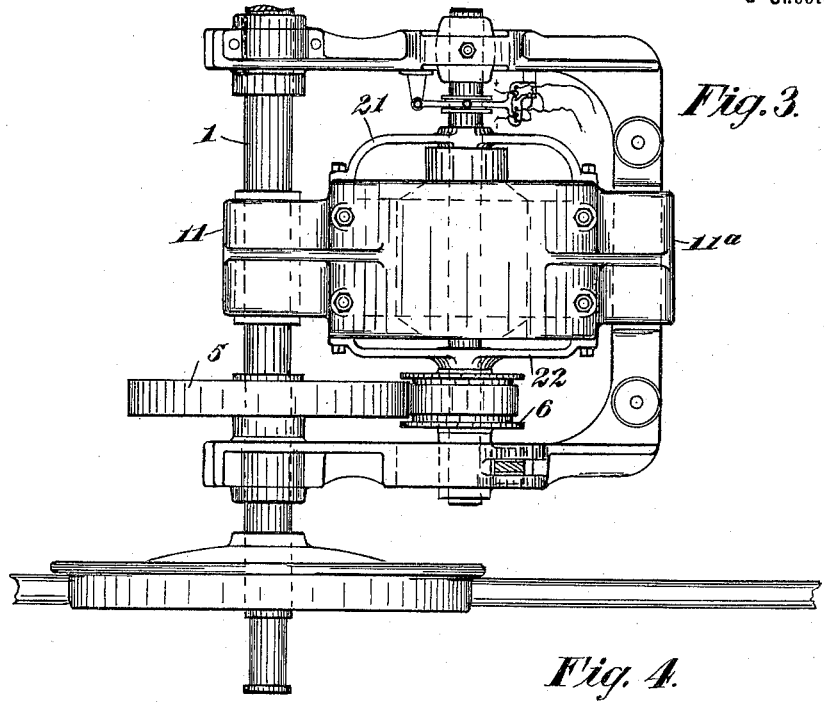
Figure 4:
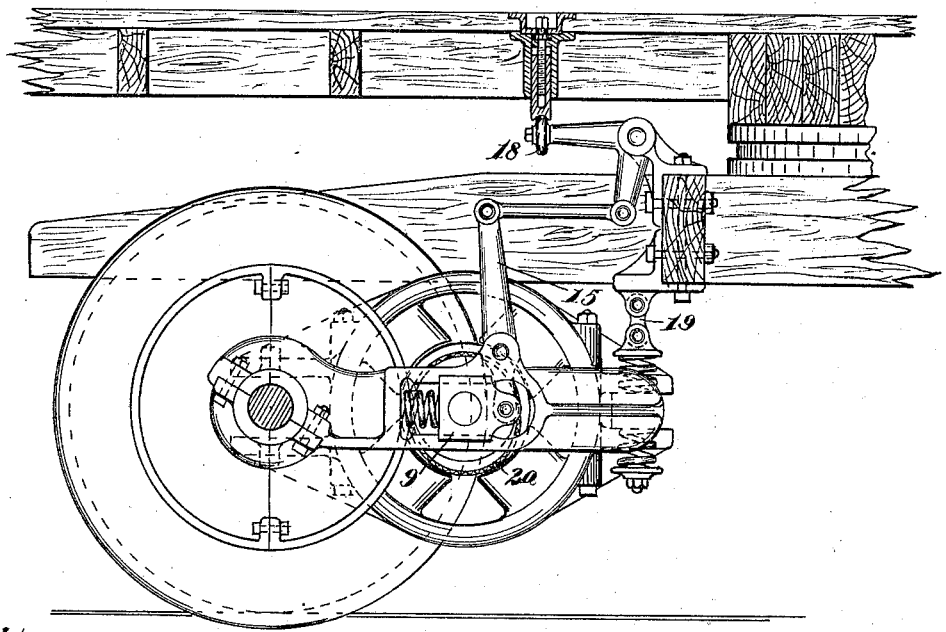

In the accompanying drawings, which illustrate the invention, Figure 1 is a plan view of suspension apparatus for an electric generator driven by a car-axle through an intermediate shaft. Fig. 2 is a side elevation, partly in section, of the organization illustrated in Fig. 1, showing also part of the truck-frame and car-floor. Fig. 3 is a view similar to Fig. 1 of a generator gearing directly with the drive-wheel on the car-axle. Fig. 4 is an elevation, partly in section, of the organization shown in Fig. 3. Fig. 5 is an enlarged detail view of the drive-wheel mounted on the car-axle and the friction-band and pulley by which motion is communicated to the generator. Fig. 6 is a central section of the friction-band and pulley. Fig. 7 is an enlarged detail view of the crank and the sliding box by which the generator is thrown into and out of operation. Fig. 8 is a top plan view of Fig. 7. Fig. 9 is a side elevation of the swivel for one end of the dynamo-shaft. Fig. 10 is a plan view of the same. Figs. 11 and 12 are detail views of the adjusting device and key by which the apparatus is adjusted from the inside of the car. Figs. 13, 14, and 15 are enlarged views of this adjusting device, showing its relation to the apparatus mounted on the car-truck by which the dynamo is put into and out of working relation with the car-axle. Fig. 16 is a plan view of the switch for automatically reversing the generator connections with the car-circuits upon a reversal of direction of travel of the car. Fig. 17 is a sectional elevation of this device. Figs. 18 and 19 are detail views of a part of these reversing devices. Fig. 20 shows the circuit connections of the electric switch in side elevation; and Fig. 21 is a plan of part of the generator-shaft, showing the mode of operating the reversing-switch.

Referring first to Figs. 1 and 2, 1 represents the axle of the car or vehicle by which my improved apparatus is driven. The dynamo-electric machine is supported in a yoke or frame 2, pivotally hung at two points 3 4 upon the axle. The car-axle is provided with a drive-wheel 5, fastened thereto, which coöperates with a flanged pulley 6, mounted in the supporting frame or yoke. In the organization shown in Figs. 1 and 2 this drive-pulley is mounted upon an intermediate shaft 7, one end of which is swiveled at 8 in the supporting-yoke and the other end of which is mounted in a box 9, sliding in ways formed in the supporting-yoke. The generator has its field-magnet fixed at one side in the yoke, as at 10, and at the other side has a forked lug 11, which bears upon the intermediate shaft 7, and thus the shaft 7 is capable of movement with relation to the generator. The intermediate shaft 7 has fixed thereon a spur-gear 12, engaging a pinion 13 on the armature-shaft of the generator, the latter rotating in fixed boxes mounted in the yoke. The sliding box 9 is pivotally connected with a lever journaled on a fulcrum 14, mounted in an extension of the yoke. The crank-lever 15 is connected with a link or connecting-rod 16, extending horizontally and pivoted to a bell-crank lever 17, mounted in a bracket secured to the truck-frame. The bell-crank lever carries at its free end a steel or iron roller 18, which engages a groove extending transversely of the car-body, formed in a steel or iron casting mounted in the car-body and adapted to be adjusted vertically with relation to the same. The yoke which supports the generator is supported at its free end by spring suspension devices connected by links 19 with the frame of the truck. Over the drive-pulley 6 I place a belt 20, (shown in detail in Figs. 5 and 6,) which normally hangs loose upon the pulley, but affords a good friction-grip between the drive-wheel 5 on the axle and the pulley when the two are forced into engagement by a proper adjustment of the gearing. The flanges of the pulley prevent displacement of the belt.

In Figs. 3 and 4 is shown a modified construction in which the generator is driven directly by the car-axle. In this organization the intermediate shaft 7 (shown in Fig. 1) is dispensed with, and one end of the generator straddles the car-axle in a manner similar to its mounting on the intermediate shaft shown in Fig. 1. The shaft of the generator may be kept central with its field-magnet by means of bracket-bearings 21 22, and both sides of the field-magnet frame are mounted so as to be capable of shifting laterally with relation to the supporting-yoke. The grooved lugs 11 11ª engaging the car-axle and the end of the yoke, respectively, permit of its movements. Thus the entire generator may be bodily moved with relation to the car-axle. The friction-wheel 5 on the car-axle engages with the pulley 6, fixed to the generator-shaft, which latter is supported at one end in the sliding box 9 and at the other end is swiveled in the yoke.

Figs. 11, 12, 13, 14, and 15 show in detail the parts of the adjusting-screw and lock secured to the car-floor by which the generator is shifted into and out of operative relation with the car-axle. In the car-floor, at a point where it will be easily accessible to one of the train operators—as, for example, at the end of a seat—there is a socket 23, and to the under side of the car-floor or its timbers is secured a guide-frame 24, provided with a hollow socket, square in cross-section, in which slides the squared end of a guide 25, on the under face of which is the groove 26, forming a track for the roller 18, hereinbefore referred to. A screw 27 takes into the stem of the guide 25, said screw being provided with a collar held between the socket 23 and the guide-frame 24 and having a squared stem 28 projecting into the cup-shaped socket 23, which is prevented from turning by a pivoted latch 29. The screw may be turned by placing the key 30 (see Fig. 12) on the squared end of the screw, the dog 29 having been first lifted, so as to permit the screw to be turned. The handle of the key may be conveniently provided with a prong 31, which may be inserted in a hole cast in the latch and the latter lifted at right angles to its normal position, as seen in Fig. 12, thus permitting the screw to be turned. The adjustment of the screw acts upon the roller 18 and through the instrumentality of the connecting devices hereinbefore described shifts the sliding box 9, so as to throw the generator into or out of clutch. On the generator-shaft is mounted the current-reversing switch by which the connections are changed, so as to deliver the same polarity of current to the car-circuits irrespectively of the direction of travel of the car. This is especially important in cases where a storage battery is to be charged on the car for lighting or other purposes.

The construction of the switch and its mode of operation will be understood from Figs. 16, 17, 18, 19, 20, and 21. The generator-shaft is provided on its periphery with a slot or groove 32, inclined with reference to the shaft-axis, into which enters a pin 33, fastened to the inside of a flanged collar 34, embracing the shaft of the generator. Between the flanges of the collar is guided a pin 35, fastened to a switch-lever 36, one end of which is pivoted on a bracket 37, mounted on the supporting-yoke of the generator, as seen in Figs. 1 and 3. The other end of the switch-lever carries two insulated contacts connecting by flexible leads with the car-circuits. These contacts coöperate with two pairs of contacts fixed upon a bracket secured to the yoke, which form the terminals of the generator-circuit. Thus when the car moves in one direction the switch-lever is shifted to one end of the inclined slot and when it moves in the opposite direction it is shifted to the other end of the slot, the generator-terminals being reversely connected with respect to the car-circuits in the two positions of the switch-lever.

By means of the organization hereinbefore described a change of position of the car-truck with relation to the car-body is permitted without strain upon the operating parts of the generating apparatus, and yet an operative relation is always maintained for the adjusting device in the car by which the generator may be readily thrown into or out of action at the desired time.

The system is particularly adapted for operation in connection with storage batteries carried on the car or train. The generating outfit may be connected with the axle at the desired time, and when the battery is raised to the desired potential the disconnection may be made while the train is under speed. The link 16 accommodates the swaying of the truck and the car-body with relation to the axle and yoke upon which the generator is supported, thus avoiding any strain upon the working parts of the generator. The movement necessary to clutch and unclutch the generator is not more than one-eighth of an inch at any time. In rounding a curve the roller 18 moves along the guide supported below the car-floor, and thus continuously maintains a working relation between the adjusting device and the sliding journal, which brings the generator into and out of working relation to the axle.

Having thus described my invention, what I claim as new, and desire to secure by Letters Patent, is—

1. In combination with a vehicle, an electric generator supported in a frame hung upon the axle of the vehicle and provided with an armature-shaft having one end pivoted to the supporting-frame and the other end mounted in a sliding bearing and provided with connections accessible from the car-body for clutching and unclutching the generator with the car-axle.

2. In combination with a vehicle, a dynamo-electric generator supported in a frame pivotally hung upon the axle at one end and spring-supported at the other end, friction-wheels, one fastened upon the axle and the other acting upon the armature of the generator, a continuous belt between the wheels, and means for shifting the generator relatively to the axle, thereby bringing the friction-wheels into and out of engagement with one another.

3. In combination with a railway-car, a dynamo-electric generator supported in a frame pivotally hung upon the car-axle, a drive-wheel mounted on the car-axle, an operating-lever pivoted on the generator-supporting frame for throwing the drive-wheel into and out of gear with the generator and a link extending lengthwise of the car pivotally connected to the lever and in operative relation to an adjusting-lever accessible from the car-floor.

4. The combination with a car, of a dynamo-electric generator supported upon a frame pivotally hung upon the car-axle, an adjustable clutch device for connecting and disconnecting the generator with the car-axle, a lever mounted on the car-truck for operating the clutch device, a roller mounted upon the free end of the lever, and a controlling device having a track for said roller transverse to the car-body, said controlling device being accessible from the inside of the car.

5. In combination with a railway-car, a dynamo-electric generator driven thereby, and a reversing-switch for changing the connections of the generator with the car-circuits, comprising a switch-lever engaging a flanged collar mounted upon a driving-shaft and means for shifting said collar in one direction or the other so as to change the circuits in accordance with the direction of movement of the car.

6. The combination of a railway-car, a dynamo-electric generator driven thereby, and a flanged collar coöperating with a reversing-switch for changing the circuits of the generator with relation to the car-circuits, said collar being provided with a pin projecting into an inclined slot formed in a shaft driven by the car.

In testimony whereof I have hereunto subscribed my name this 25th day of July, A. D. 1898.

JAMES WAYLAND.

Witnesses:
  ROBT. H. READ,
  ALICK G. MACANDREW.